United States Patent

[11] 3,618,720

| [72] | Inventor | Ernest A. Linke<br>Maplewood, N.J. |
|---|---|---|
| [21] | Appl. No. | 59,459 |
| [22] | Filed | July 30, 1970 |
| [45] | Patented | Nov. 9, 1971 |
| [73] | Assignee | Bulova Watch Company Inc.<br>New York, N.Y. |

[54] MAGNETIC-PARTICLE CLUTCH OR BRAKE
8 Claims, 7 Drawing Figs.

[52] U.S. Cl. ..................................................... 192/21.5,
188/164
[51] Int. Cl. ...................................................... F16d 37/02
[50] Field of Search........................................... 192/21.5;
188/164

[56] References Cited
UNITED STATES PATENTS
2,635,483 4/1953 Welsh............................ 192/21.5 X
2,916,944 12/1959 Diesfeld........................ 192/21.5 X
3,358,798 12/1967 Janson.......................... 192/21.5

*Primary Examiner*—Allan D. Herrmann
*Attorney*—Michael Ebert

ABSTRACT: A magnetic-particle clutch constituted by a stator surrounding a rotor assembly having an input member and an output member which are intercoupled when the stator coil is excited. The input or drive member is a cylindrical body having an annular cavity for containing magnetic particles, the output or driven member being formed by a shaft coaxially disposed within the input member and rotatably supported therein, a cylindrical particle-trap rotor being mounted on said shaft and being positioned to rotate within the annular cavity. The particle-trap is formed by a circular cage of alternately polarized parallel bars which create an internal magnetic field to retain the magnetic particles in the interstices of the cage in the unexcited state of the clutch. When the stator coil is excited to produce an external magnetic field, the particles are reoriented to bind the cage to the input member, thereby coupling the drive and driven members.

PATENTED NOV 9 1971　　　　3,618,720

INVENTOR.
ERNEST A. LINKE
BY
*Michael Ebert*
ATTORNEY

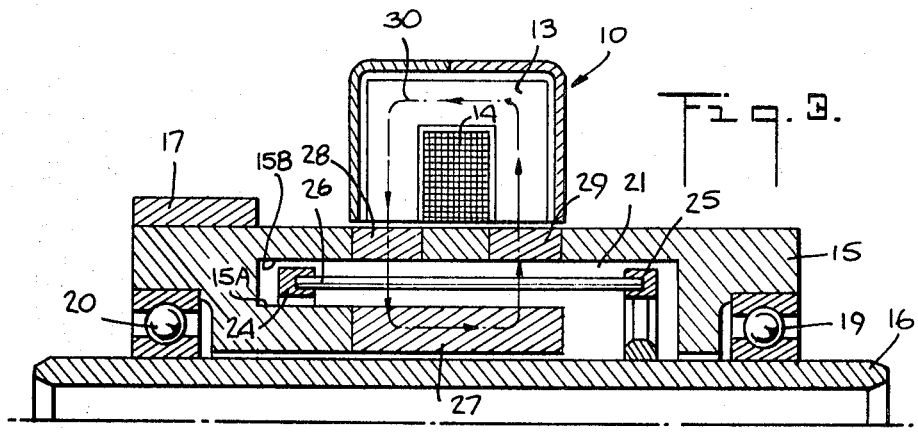
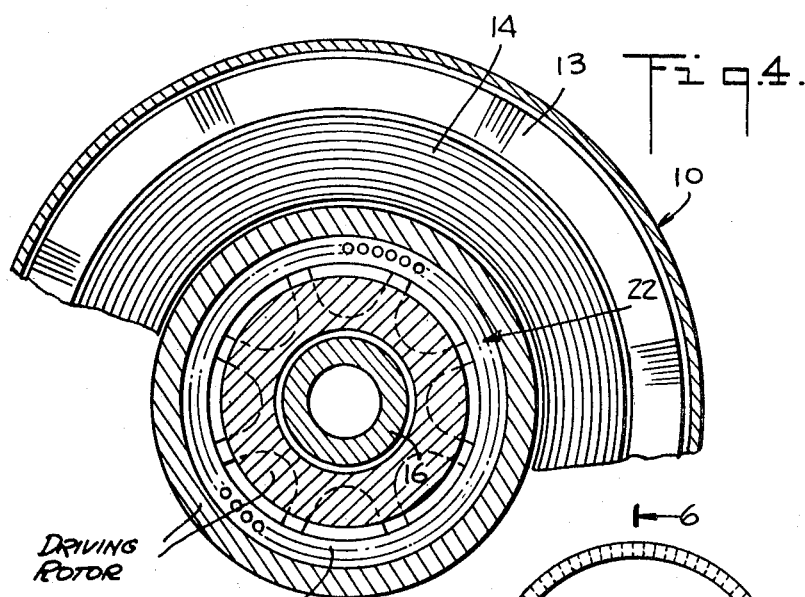
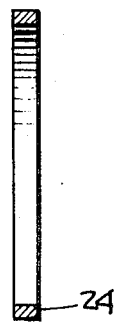
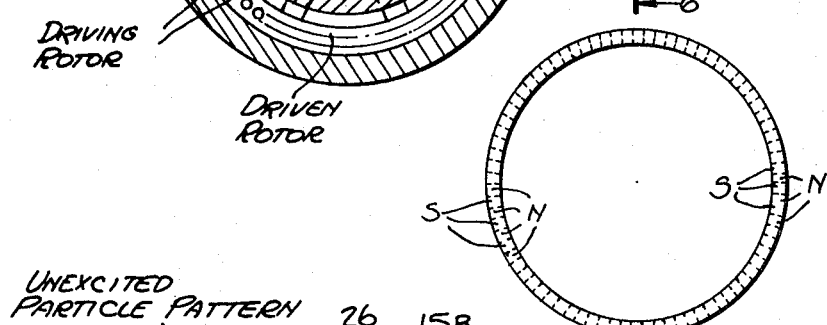
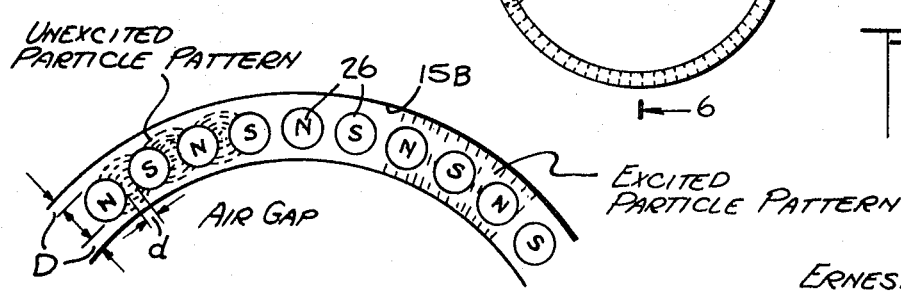

MAGNETIC-PARTICLE CLUTCH OR BRAKE

BACKGROUND OF THE INVENTION

This invention relates generally to clutches and brakes, and more particularly to an improved magnetic-particle clutch or brake.

The function of a clutch is to effect a coupling of two working parts in such a way as to permit connection or disconnection at will and without the necessity of bringing both parts to rest. A clutch, therefore, is a coupling between a driving member or shaft and a driven shaft, the clutch acting to pull the driven member up to the speed of the driving member and to transmit the required amount of power without slip. A brake is similar in principle and construction to a clutch, except that a brake connects a rotating member to a stationary member. Hence, while the invention will be described in connection with a magnetic-particle clutch, it is to be understood that the principles thereof are equally applicable to magnetic-particle brakes.

Magnetic-particle clutches effect coupling of the working parts by finely divided particles of magnetic material. When energized, the loose particles are transformed into a quasi-solid, thereby locking the parts together. This type of clutch is characterized by torque independent of slip speed and proportional to excitation current. Magnetic-particle clutches are smooth at all speeds and rates of slip, and they respond quickly with good torque at low excitation. A salient feature of such clutches is smooth starting or stopping of loads possessing a high enertia relative to the available torque.

Typical applications for magnetic-particle clutches include printing presses, machine tools, as well as peripheral equipment for electronic data-processing systems such as printers, tape punches and servo mechanisms.

In one widely used type of magnetic-particle clutch, the device is constituted by a two-piece unit formed by a rotor and stator, the stator being disposed concentrically about the rotor. The stator winding, to which current is applied, creates a flux field which bridges the gap between rotor and stator. The rotor assembly consists of an input and an output member. The input hub of the rotor is attachable to either a rotating element when used as a clutch, or to a stationary element when employed as a brake. The output shaft, which passes through the body of the input member, rotates therein.

Mounted on the output shaft is a cylindrical drum which is part of the output member and which rotates within a cavity formed in the input member. This cavity, which is terminated by powder seals, is partially filled with magnetic particles, the particles being dispersed in the gaps disposed on either side of the cylindrical drum. When the clutch is energized and flux is generated, the lines of force cross the particle gaps, causing the magnetic particles to link together into chains which bind the drum to the input member. In this way, the input member is coupled to the output member, causing them both to rotate at the same speed.

Magnetic-particle clutches of the above-described type operate quickly and efficiently as long as the particles remain dispersed within the cavity and do not migrate therefrom toward the ball bearings which rotatably support the output shaft within the body of the input member. However, in practice, such migration takes place particularly during operation of the clutch at a position inclined with respect to the horizontal or when the clutch is unexcited and the loose particles are then free to shift position.

The resultant contamination of the bearings and loss of particles impairs the efficiency of the clutch and shortens its effective life.

In an attempt to overcome these drawbacks, U.S. Pat. No. 2,863,538 provides annular permanent magnets in place of the conventional contact seals. These magnets prevent the particles from escaping from the cavity or from working their way into the bearings. However, magnetic particle seals tend to attract the particles toward the seals, rather than maintaining the particles dispersed throughout the cavity gaps. Consequently, the particles tend to bunch or conglomerate in the area of the seals, with a resultant particle starvation in the operative region of the clutch.

SUMMARY OF THE INVENTION

In view of the foregoing, it is the main object of this invention to provide an improved magnetic-particle clutch which includes a particle trap rotor affording the following advantages:

A. It reduces migration of magnetic particles during operation at positions other than horizontal and thereby enhances torque consistency when the clutch is operated at angular positions displaced from the horizontal, including the vertical position.

B. It reduces particle migration during the unexcited state of the clutch and thereby minimizes shaft sealing problems.

C. it withdraws the magnetic particles from the drive member when excitation is cut off and thereby reduces residual torque in the unexcited state.

More specifically, it is an object of this invention to provide a particle-trap rotor for a clutch, which trap rotor is constituted by a cylindrical cage of magnetic bars which are alternately polarized to create an interstitial field which tends to draw the particles thereto in the absence of an external field, thereby preventing migration of the particles in the unexcited state and maintaining the particles at their optimum dispersed positions preparatory to excitation.

Also an object of the invention is to provide a magnetic-particle clutch which is quick-acting, efficient and reliable in operation and which has a prolonged, trouble-free life.

Briefly stated, these objects are accomplished in a magnetic-particle clutch whose rotor assembly is constituted by a cylindrical input member having an annular cavity therein and an output member having an output shaft which is coaxially disposed within the input member and is rotatably supported therein by bearings, said output shaft having a particle-trap rotor mounted therein. The rotor is constituted by a cylindrical cage which rotates within said cavity and is formed by a circular array of bars which are magnetized in alternate polarities to create a permanent magnetic internal field in the interstices of the cage to retain the magnetic particles therein in the absence of excitation. Surrounding the rotor assembly is a stator including an excitation coil adapted to establish an external magnetic field which extends through the cavity and serves to reorient the particles therein to lock the cage to said member to effect coupling between the input and output member of the rotor assembly.

OUTLINE OF THE DRAWING

For a better understanding of the invention, as well as other objects and further features thereof, reference is made to the following description to be read in conjunction with the accompanying drawing, in which:

FIG. 3 is a longitudinal half-section of the clutch structure;

FIG. 4 is a transverse section taken through the clutch;

FIG. 5 shows, in elevation, one of the permanent rings included in the rotor trap;

FIG. 6 is a section taken through the diametrical plane of the ring indicated by line 6—6 in FIG. 5; and FIG. 7 schematically illustrates the manner in which the magnetic particles are oriented with respect to the particle-trap rotor bars in both the unexcited and the excited state.

DESCRIPTION OF THE INVENTION

Figure 1:
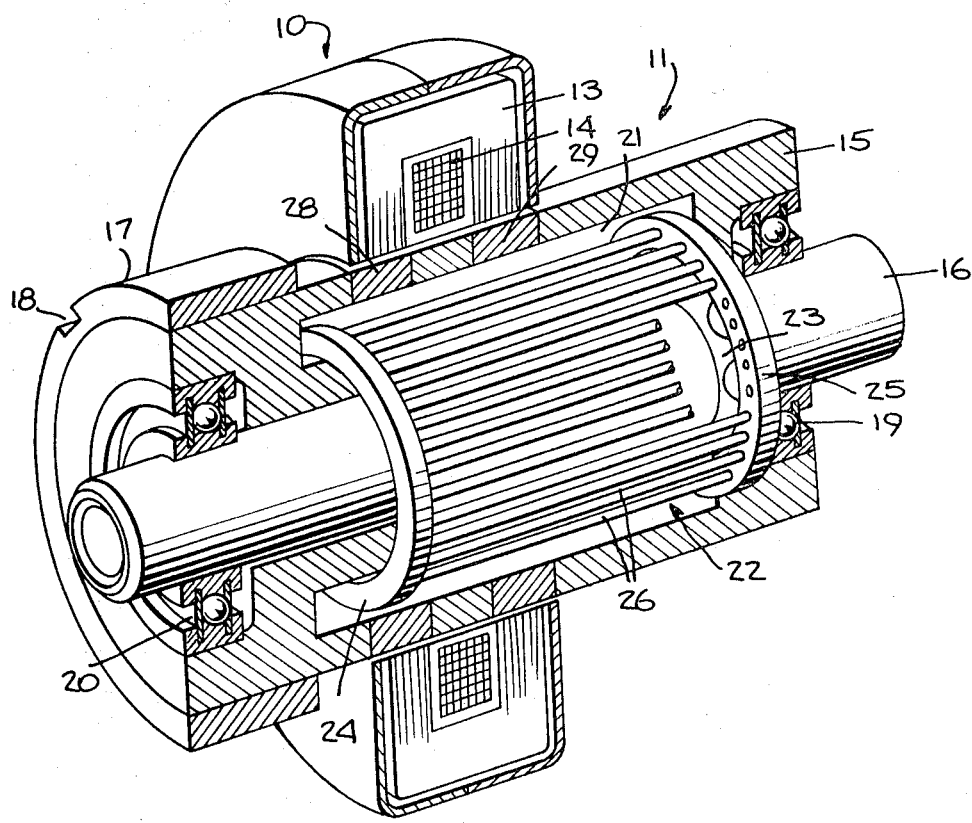
FIG. 1 is a perspective, cutaway view of a magnetic-particle clutch in accordance with the invention.

Referring now to the drawing, and more particularly to FIG. 1, there is shown a magnetic clutch in accordance with the invention, which clutch is constituted by a stator generally designated by numeral 10, which is concentrically mounted about a rotor assembly generally designated by numeral 11. The stator is mounted by means of suitable lugs or other means to a support so that the stator position is always stationary.

Stator 10 consists of a laminated core 13 and a single or multiwinding coil 14 to which current is applied to establish an electromagnetic field which penetrates the rotor assembly in a manner to be later described.

Rotor assembly 11 is formed by an input or drive member 15, in the form of a cylindrical body made of a combination of magnetic and nonmagnetic material and having an input hub 17 attached thereto. The hub is provided with a keyway 18 or other means to facilitate linkage by means of a pulley or gear to either a rotating drive element, when used as a clutch, or a stationary element, when used as a brake. The output or driven member 16 is in the form of a hollow shaft which extends coaxially through the input member and is supported for rotation thereby by ball bearings 19 and 20. In the absence of excitation, drive member 15 is decoupled from driven member 16.

Input member 15 of the rotor assembly is internally grooved to define an annular cavity 21 which is adapted to contain fine magnetic particles. Concentrically disposed within annular cavity 21 is a particle-trap rotor, generally designated by numeral 22, which is securely mounted on output member shaft 16 by means of a spider 23 of nonmagnetic material. Though particle-trap rotor 22 serves to retain the magnetic particles within the cavity and to resist migration thereof, in practice one may terminate the cavity with powder barriers in the form of loose felt material (not shown) to prevent even a minute amount of particles from reaching and contaminating the bearings.

Figure 2:
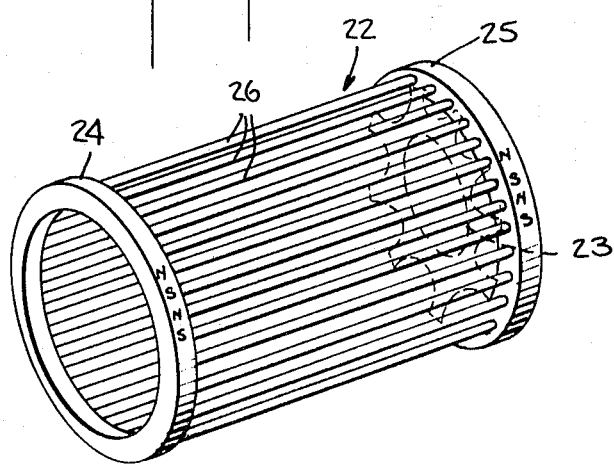
FIG. 2 is a separate perspective view of the particle-trap rotor incorporated in the structure of the clutch.

As best seen in FIG. 2, the particle-trap rotor is in the form of a cylindrical cage consisting of two permanent magnet rings 24 and 25 interconnected by a circular array of bars 26 of ferromagnetic material. The bars may be round, elliptical or any other cross-sectional shape adapted to accomplish the desired purpose. The advantage of an elliptical cross section is that the effective particle-engaging surface is enhanced. These bars are alternately polarized, thereby creating a permanent magnetic field in the interstices therebetween, which internal field holds the magnetic particles within the interstices of the trap in the absence of an external field.

In order to alternately magnetize the bars, rings 24 and 25 are preferably made of sintered ferrites or ceramic ferrospinels suitable for fabricating permanent magnets and having high values of residual induction and coercive force, and are so magnetized as to create a circumferential series of magnetic poles. In the example shown in FIGS. 5 and 6, the ring is magnetized to create 58 such poles. It will be appreciated that in practice, any appropriate number of poles may be used with an equal number of parallel bars.

Each bar extends between like poles on the two rings, so that one bar extends between two north poles; the adjacent bar extends between two south poles; and so on, whereby transverse lines of flux are established between the bars to create a concentric magnetic field within annular cavity 21.

Cavity 21, containing the magnetic particles, is bordered by the inner section 15A of the cylindrical input member 15 and by the outer section 15B thereof. Inner section 15A is provided with a cylindrical insert 27 of magnetic material, the insert being positioned to register with the stator 10, whereas the outer section 15B is provided with a pair of spaced inserts 28 and 29 of magnetic material, the inserts being positioned to register with the core section of the stator, the space therebetween registering with coil 14.

Thus, as best seen in FIG. 3, the external field which is created when coil 14 is energized, as represented by the flux lines 30, has a generally rectangular path, and lines being through insert 28 into insert 27 and from insert 27 back to insert 29, thereby intercepting the particles in cavity 21.

Let us first consider the clutch in the deenergized state. In this condition, there is no external field and, as shown in FIG. 7, the magnetic particles are retained in the spaces between the bars where they are held by the internal magnetic field created by the bars of the cage. In the energized state, the stator coil is energized and the permanent magnetic field produced by the cage is overcome and dominated by the much stronger external field. As a consequence, the magnetic particles then link together to form chains creating bridges between the particle-trap rotor bars and the inner and outer sections 15A and 15B of the input member, thereby coupling the input or drive member to the output or driven member of the rotor assembly and causing them both to rotate at the same speed.

When used as a clutch, the input hub is rotating; hence when the stator coil is energized, the output member will be caused to rotate therewith. When used as a brake, the input hub is keyed to a stationary support.

It will be seen in FIG. 7 that a magnetic gap represented by D exists between the bars and the adjacent surfaces 15A and 15B of the input member, and that a magnetic gap represented by $d$ exists in the space between the bars. The relationship between D and $d$ is made such that in the deenergized state, the magnetic particles accumulate predominantly in gap $d$.

Hence in the static state, the magnetic particles are not free but are retained by the trap, and particle migration toward the bearings is resisted even if the clutch is mounted at a position other than the horizontal. Moreover, when the clutch is switched from the energized state to the deenergized state, thereby releasing the particles from the drive member, the particles are not let loose but are drawn back to the internal permanent-magnet trap field, again preventing migration and reducing residual torque in the deenergized state of the clutch.

While there has been shown and described a preferred embodiment of the magnetic-particle clutch or brake, it is to be appreciated that many changes and modifications may be made therein without, however, departing from the essential spirit of the invention. For example, instead of having the particle-trap on the rotor as shown, the bars forming the particle-trap may be mounted in a circular array on the drive member rather than on the driven member, in which event the rotor would be a drum which may or may not be perforated, serrated or corrugated. Also, instead of having permanent-magnet rings at both ends of the rotor, one may use a single permanent-magnet ring at the center of the rotor, with bars extending from either side of the single ring.

In some clutch designs the rotor is not a drum but is disc-shaped. To apply the present invention to a clutch of this design, the particle-trap rotor is constituted by a radial array of alternatively polarized bars. Also, while a laminated core is disclosed for the stator, in practice the core may be made of sintered iron or other material.

I claim:

1. A magnetic particle clutch comprising:
  A. a stator having a core and a coil which, when excited, creates an external magnetic field, and
  B. a rotor assembly disposed within said stator and constituted by a cylindrical drive member having an annular cavity bordered by inner and outer walls for containing magnetic particles, said walls having inserts of magnetic material, and a driven member supported for rotation within the drive member and including an output shaft and a cylindrical particle-trap rotor mounted on said shaft and concentrically disposed within said annular cavity, said rotor being constituted by a circular cage formed by parallel bars which are alternately polarized to create a permanent magnetic field in the interstices therebetween to hold the magnetic particles in the absence of excitation and to prevent migration thereof, said particles forming chains between the bars and said inner and outer walls when the clutch is excited, thereby coupling the drive member to the driven member.

2. A clutch as set forth in claim 1, wherein said drive member is provided with a keyed hub for linking the drive member to a drive pulley or gear.

3. A clutch as set forth in claim 1, wherein the stator is in annular form and wherein the core is laminated, the coil being centered with respect to the core.

4. A clutch as set forth in claim 1, wherein the bars of the cage extend between a pair of permanently magnetized end rings, each having a circumferential series of magnetic poles, each bar being connected between like poles on the rings.

5. A clutch as set forth in claim 4, wherein the bars are round in cross section.

6. A clutch as set forth in claim 4, wherein said rings are fabricated of ferrite material.

7. A clutch as set forth in claim 1, further including ball bearings for supporting the output shaft for rotation within the drive member.

8. A magnetic-particle clutch comprising:

A. a stator having a core and a coil which when excited creates an external magnetic field; and B. a rotor assembly disposed within said stator and constituted by a drive member having a cavity containing magnetic particles, and a driven member including a shaft mounted for rotation within the drive member, and a rotor mounted on said shaft for rotation within said cavity, said rotor being constituted by alternately polarized spaced bars creating a permanent magnetic field in the interstices therebetween to hold the particles therein in the absence of excitation and to prevent migration thereof, said particles forming chains between the bars of the rotor and the drive member when the clutch is excited.

* * * * *